United States Patent
Snyder

(10) Patent No.: US 9,790,893 B2
(45) Date of Patent: Oct. 17, 2017

(54) GAS TURBINE ENGINE FLOW DUCT HAVING INTEGRATED HEAT EXCHANGER

(71) Applicant: Rolls-Royce North American Technologies, Inc., Indianapolis, IN (US)

(72) Inventor: Douglas J. Snyder, Carmel, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 745 days.

(21) Appl. No.: 14/136,262

(22) Filed: Dec. 20, 2013

(65) Prior Publication Data

US 2015/0047315 A1 Feb. 19, 2015

Related U.S. Application Data

(60) Provisional application No. 61/784,492, filed on Mar. 14, 2013.

(51) Int. Cl.
| | |
|---|---|
| *F02C 1/00* | (2006.01) |
| *F02K 3/115* | (2006.01) |
| *F02C 7/14* | (2006.01) |
| *F02C 7/18* | (2006.01) |

(52) U.S. Cl.
CPC .............. *F02K 3/115* (2013.01); *F02C 7/14* (2013.01); *F02C 7/18* (2013.01); *Y02T 50/675* (2013.01)

(58) Field of Classification Search
CPC ...... F02C 7/12; F02C 7/16; F02C 7/18; F02C 7/185; F02C 7/10
See application file for complete search history.

(56) References Cited

U.S. PATENT DOCUMENTS

| | | | | |
|---|---|---|---|---|
| 3,756,020 A | * | 9/1973 | Moskowitz | F02C 7/14 415/114 |
| 3,886,737 A | * | 6/1975 | Grieb | F02K 3/077 181/220 |
| 4,550,562 A | * | 11/1985 | Rice | F01K 23/10 60/728 |
| 4,592,204 A | * | 6/1986 | Rice | F01D 5/185 60/39.17 |
| 5,318,109 A | * | 6/1994 | Yamada | F22B 37/40 122/4 R |
| 5,452,573 A | | 9/1995 | Glickstein et al. | |
| 6,134,880 A | | 10/2000 | Yoshinaka | |
| 7,140,174 B2 | | 11/2006 | Johnson | |
| 7,334,411 B2 | | 2/2008 | Vandermolen | |

(Continued)

FOREIGN PATENT DOCUMENTS

| | | |
|---|---|---|
| DE | 102010032324 A1 | 2/2012 |
| GB | 1358076 A | 6/1974 |

OTHER PUBLICATIONS

International Search Report for PCT/US2013/070315 mailed Mar. 17, 2014.

*Primary Examiner* — Gerald L Sung
(74) *Attorney, Agent, or Firm* — Fishman Stewart PLC

(57) ABSTRACT

A gas turbine engine flow duct comprising a flow duct disposed along an engine centerline of the gas turbine engine and defining a stream flow passage, and first and second rows of heat exchangers disposed along the engine centerline of the gas turbine engine and integrated in the flow duct in fluid communication with the stream flow passage of the flow duct.

14 Claims, 13 Drawing Sheets

(56) References Cited

U.S. PATENT DOCUMENTS

| | | |
|---|---|---|
| 7,377,100 B2 | 5/2008 | Bruno et al. |
| 7,765,788 B2 | 8/2010 | Schwarz |
| 7,810,311 B2 | 10/2010 | Schwarz et al. |
| 7,861,512 B2 | 1/2011 | Olver et al. |
| 8,910,465 B2 * | 12/2014 | Snyder .................... F01D 25/12 60/266 |
| 8,961,114 B2 * | 2/2015 | Ruthemeyer ........... F01D 5/146 415/145 |
| 9,234,481 B2 * | 1/2016 | Suciu ........................ F02C 7/14 |
| 2003/0019214 A1 * | 1/2003 | Shibata ................ F01K 21/047 60/775 |
| 2004/0020213 A1 * | 2/2004 | Jones ..................... F28D 15/02 60/772 |
| 2004/0139722 A1 * | 7/2004 | Czachor ............... F28D 9/0037 60/39.511 |
| 2007/0264133 A1 | 11/2007 | Schwarz et al. |
| 2009/0188234 A1 | 7/2009 | Suciu et al. |
| 2010/0000217 A1 | 1/2010 | Ralls, Jr. |
| 2011/0061846 A1 | 3/2011 | Morris et al. |
| 2012/0128467 A1 | 5/2012 | Ruthemeyer |
| 2012/0144842 A1 | 6/2012 | Snyder |
| 2012/0272658 A1 * | 11/2012 | Murphy ................ F01D 17/085 60/783 |

* cited by examiner

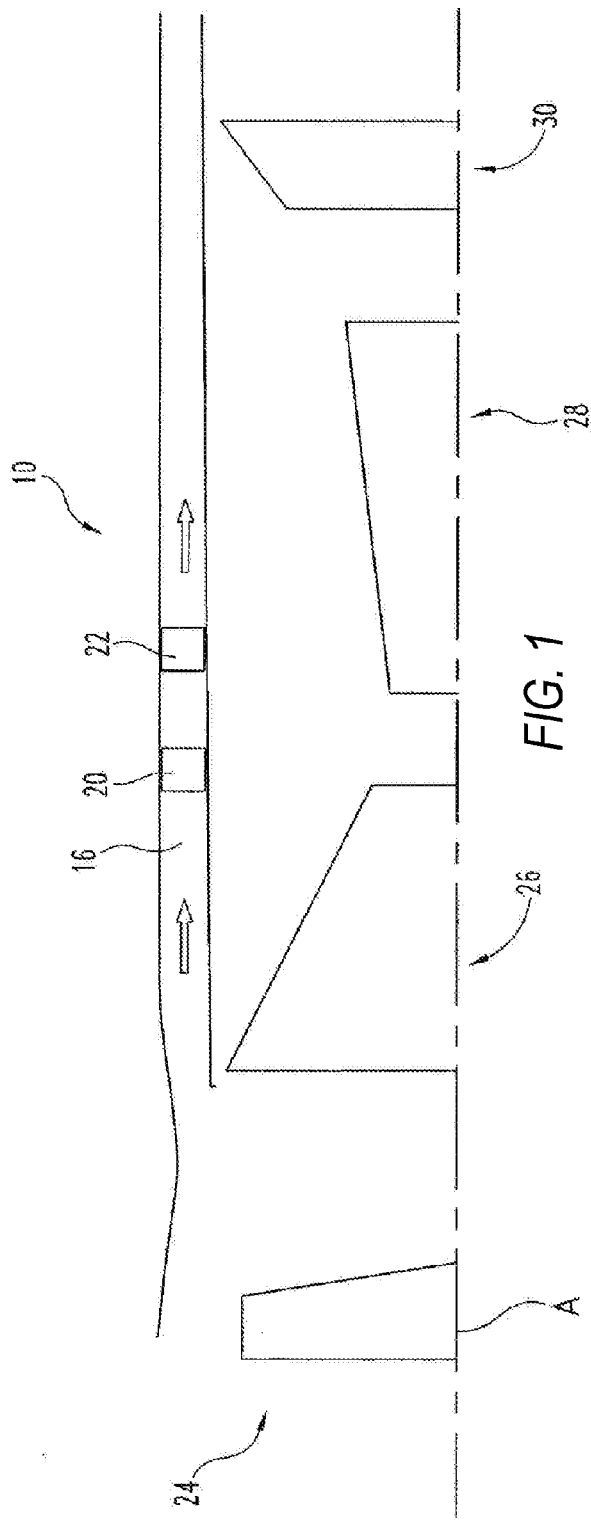
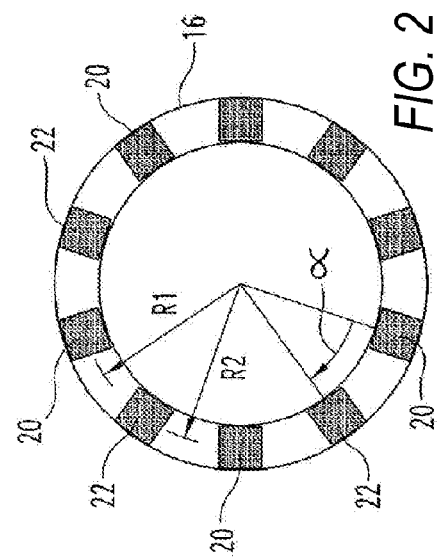

GAS TURBINE ENGINE FLOW DUCT HAVING INTEGRATED HEAT EXCHANGER

CROSS-REFERENCE TO RELATED APPLICATIONS

This application claims priority to U.S. Provisional Patent Application No. 61/784,492, filed Mar. 14, 2013, the contents of which are hereby incorporated in their entirety.

TECHNICAL FIELD

The present application relates to gas turbine engines, and more particularly, to a gas turbine engine flow duct having one or more integrated heat exchangers.

BACKGROUND

Gas turbine engines, and gas turbine engine flow ducts having heat exchangers remain an area of interest. Some existing systems have various shortcomings, drawbacks, and disadvantages relative to certain applications. Accordingly, there remains a need for further contributions in this area of technology.

SUMMARY

One embodiment of the present application is a gas turbine engine flow duct including a flow duct in which first and second rows of heat exchangers are disposed along an engine centerline of the gas turbine engine in fluid communication with a stream flow passage of the flow duct to adjust a pressure drop across the heat exchangers. Other embodiments include unique methods, systems, devices, and apparatus to provide for a gas turbine engine flow duct. Further embodiments, forms, objects, aspects, benefits, features, and advantages of the present application shall become apparent from the description and figures provided herewith.

BRIEF DESCRIPTION OF THE FIGURES

Features of the application will be better understood from the following detailed description when considered in reference to the accompanying drawings, in which:

FIG. 1 is a an axial sectional schematic showing a gas turbine engine including a flow duct having integrated heat transfer components according to an embodiment.

FIG. 2 is an end sectional view of a portion of the FIG. 1 gas turbine engine flow duct having integrated heat transfer components, showing a circumferential arrangement of the heat transfer components according to an embodiment.

DETAILED DESCRIPTION

Figure 3:
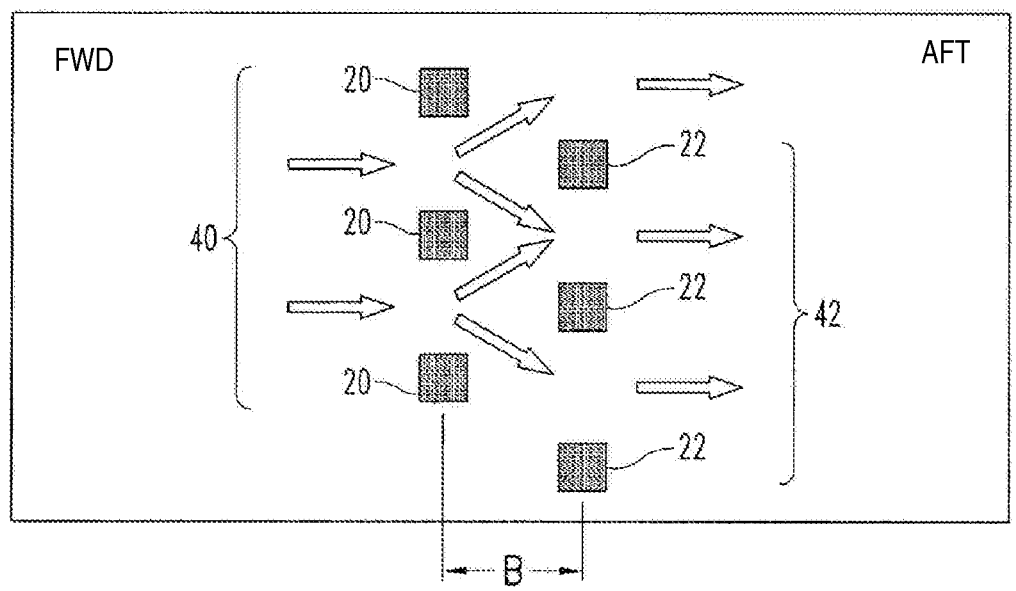
FIG. 3 is a schematic showing an outer diameter to engine centerline view of a sector of the FIG. 1 gas turbine engine flow duct having integrated heat transfer components, showing an axial arrangement of the heat transfer components according to an embodiment.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

FIGS. 1-3 show a gas turbine engine 10 including a flow duct 16 and an arrangement of heat exchangers and/or condensers 20, 22 according to an embodiment. As used herein, the term "heat exchanger" and "HX component" refers to heat exchangers and/or condensers. FIG. 1 shows the major components of the gas turbine engine 10, including the flow duct 16, a fan 24, a compressor section 26, a combustion section 28, and a turbine section 30. The flow duct 16 depicted in the FIG. 1 embodiment is an axially extending, that is forward to aft extending, annular bypass flow duct that surrounds all or part of the core of the gas turbine engine 10. The flow duct 16 can receive airflow from the fan 24 at the forward end of the gas turbine engine 10 and convey the airflow to the aft end of the gas turbine engine 10, where it is expelled coaxially with the engine exhaust to produce additional thrust. As will be appreciated, the gas turbine engine 10 and the flow duct 16 are not limited to the configuration shown in FIG. 1, and other embodiments are contemplated. For example, in one form, the flow duct 16 can comprise a high bypass flow duct. In another form, the flow duct 16 can comprise a ram air flow duct. In another form, multiple flow ducts can be provided comprising bypass flow ducts and/or ram air flow ducts. For example, in an embodiment a first bypass flow duct can surround the core of the gas turbine engine 10 to define a second stream flow, and a second bypass flow duct can surround the first bypass flow duct to define a third stream flow. In other embodiments, the flow duct, or multiple flow ducts, may have other configurations suited to the particular application of the gas turbine engine 10.

Referring to FIGS. 2 and 3, the HX COMPONENTs 20, 22 are integrated in the flow duct 16 in fluid communication with the bypass stream flow of the flow duct 16. The HX components 20, 22 can be used to cool a fluid and/or one or more components and/or systems of the gas turbine engine 10 or external to the gas turbine engine 10. For example, the object of cooling can be one or more of hydraulic fluid and/or related systems/components, electrical and/or electronic circuits and/or systems, mechanical components and/or systems, and/or other components and/or systems, such as refrigeration components and/or systems.

In FIG. 3 embodiment, first and second, or forward and aft, rows 40, 42 of HX components 20, 22 are integrated in the flow duct 16. As shown in FIG. 3, the first row 40 of HX components 20 can be axially spaced apart a distance B from the second row 42 of HX components 22 along an engine centerline A of the gas turbine engine 10. Further, as shown in FIG. 2, the HX components 20 of the first row 40 can be circumferentially disposed about the engine centerline A at a radial distance R1 from the engine centerline A, and the HX components 22 of the second row 42 can be circumferentially disposed about the engine centerline A at a radial distance R2 from the engine centerline A. In the present embodiment, the HX components 20 are equally circumferentially spaced apart, and the HX components 22 are equally circumferentially spaced apart, and the radial distance R1 is substantially the same as the radial distance R2. Further, the quantity of HX components 20, 22 can be the same in each row 40, 42, for example as illustrated. Referring to FIGS. 2 and 3, the HX components 22 of the second row 42 can be angularly offset, or staggered, by an angle alpha (0) in the clockwise direction relative to the HX components 20 of the first row 40. In the present embodiment, the angular offset is such that the HX components 22 are equally angularly displaced from circumferentially adjacent HX components 20. The configuration of the HX components 20, 22 of FIGS. 1-3 can be used to adjust the pressure drop that the airflow path in the flow duct 16, represented by arrows in FIG. 3, undergoes when passing from the upstream end of the first row 40 of HX components 20 to the downstream end of the second row 42 of HX components 22.

The multiple rows 40, 42 of HX components 20, 22 configured as shown for example in FIGS. 1-3 can reduce the pressure drop across the HX components 20, 22, for a given amount of heat rejection to the flow duct 16. By reducing the pressure drop, the gas turbine engine 10 can burn less fuel in maintaining a given thrust, for example a constant thrust. The configuration of multiple rows 40, 42 of HX components 20, 22 can reduce the pressure drop which, in turn, can reduce the amount of fuel burn at constant thrust for a given amount of heat rejection as compared to for example a single row of HX components. This can provide, for example, fuel savings and increased vehicle range capability per amount of heat rejected.

The integrated flow duct 16 and HX components 20, 22 are not limited to the arrangement shown in FIGS. 1-3, other embodiments are also contemplated herein. For example, rather than first and second 40, 42 rows of HX components 20, 22, there can be three or more rows of HX components for an application. Further, the type and/or quantity of HX components 20 in the first row 40 need not be the same as the type and/or quantity of HX components 22 in the second row 42, and HX components 20, 22 within a given row 40, 42 need not be the same type. Further, the first row 40 of HX components 20 is not limited to being axially spaced apart from the second row 42 of HX components 22 by the distance B as illustrated, and instead the HX components 20 of the first row 40 can be disposed along different axial locations, and the HX components 22 of the second row 42 can be disposed along different axial locations, such that for example the axial spacing between the HX components 20 of the first row 40 and the HX components 22 of the second row 42 is not a constant distance B but rather for example a distance B for some HX components 20,22 and a different distance for other HX components 20, 22.

Also, the circumferential and radial distribution of the HX components 20, 22 about the engine centerline A is not limited to that which is depicted in the embodiment shown in FIGS. 1-3. In one form, the radial distance R1 of the HX components 20 from the engine centerline A can be different from that of the radial distance R2 of the HX components 22 from the engine centerline A, for example in an application where the annular shape of the flow duct 16 changes along the engine centerline A. Further, the circumferential spacing between the HX components 20 need not be equal, and the circumferential spacing between the HX components 22 need not be equal; the circumferential spacing can be different for the HX components 20 and/or the HX components 22. Still further, the angular offset alpha (0) between the HX components 20 and the HX components 22 is not limited to that shown in FIG. 2; for example, the angular offset alpha (0) for HX components 20, 22 can be different for different sectors of the arrangement of HX components 20, 22.

Figure 5:
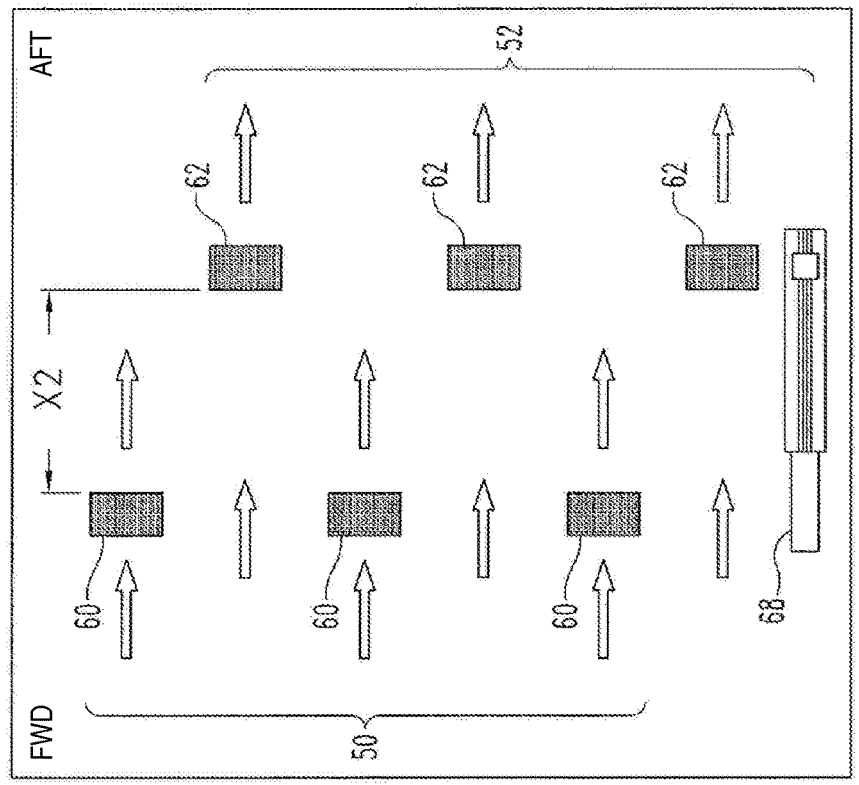
FIG. 5 is a schematic showing the FIG. 4 arrangement with a relatively increased axial spacing between the first and second rows of heat transfer components.
Figure 4:
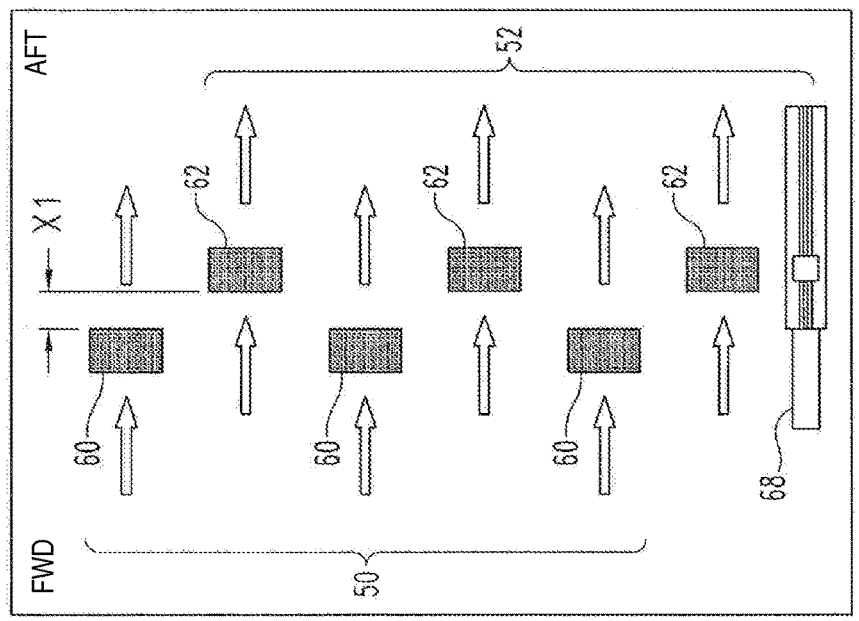
FIG. 4 is a schematic showing an outer diameter to engine centerline view of a sector of a gas turbine engine flow duct having integrated heat transfer components and an axial displacing device according to an embodiment, showing a relatively decreased axial spacing between first and second rows of heat transfer components.

FIGS. 4 and 5 show first and second rows 50, 52 of HX components 60, 62, and an axial displacing device 68 for integration into for example the flow duct 16 of the gas turbine engine 10 according to an embodiment. The quantity and/or spacing of the HX components 60, 62 can be the same, or different, from that of the HX components 20, 22 of the FIG. 1 embodiment. The axial displacing device 68 can be any suitable linear motion driving mechanism, for example a linear servo drive, that relatively axially displaces the first and second rows 50, 52 of HX components 60, 62 along the engine centerline A (see FIG. 1). In FIG. 4, the axial displacing device 68 relatively axially displaces the second row 52 of HX components 62 by a distance X1 from the first row 50 of HX components 60. In FIG. 5, the axial displacing device 68 relatively axially displaces the second row 52 of HX components 62 by a distance X2 from the first row 50 of HX components 60.

The integration of multiple rows 50, 52 of HX components 60, 62 and axial displacement capability into the flow duct 16 having an arrangement as shown for example in FIGS. 4-5 can be used for example to adjust the amount of heat rejection most suited for a particular application and/or engine cycle condition. For example, by relatively decreasing the distance between the first and second rows 50, 52 of HX components 60, 62, for example from X2 in FIG. 5 to X1 in FIG. 4, a greater amount of airflow passes through the HX components 60, 62, and therefore the heat rejection capacity of the HX components 60, 62 increases. This also can result in increased flow duct pressure losses and associated fuel burn penalty increases. On the other hand, for example, by relatively increasing the distance between the first and second rows 50, 52 of HX components 60, 62, for example from X1 in FIG. 4 to X2 in FIG. 5, a less amount of airflow passes through the HX components 60, 62, and therefore the flow duct pressure losses decrease and the associated fuel burn penalty decreases. This also can result in reduced heat rejection capacity. The embodiment of FIGS. 4-5 thus provides for varying the geometry of the integrated HX components 60, 62 relative to the flow duct 16 and/or relative to each other in such a way as to selectively increase system heat rejection and/or decrease flow duct pressure losses and associated fuel burn penalty for a particular application, depending on operating conditions such as heat rejection requirements and engine operation requirements, and/or environmental conditions, as would occur to those skilled in the art. Thus, the variable geometry system of FIGS. 4-5 provides greater flexibility in adjusting to variable engine cycles and/or variable heat loads. For example, in one form, increasing pressure loss increases heat rejection for a given engine operating condition. In another form, when engine operating conditions change, the first and second rows 50, 52 of HX components 60, 62 can be moved relative to one another to meet heat rejection requirements while minimizing the pressure losses. In one form, the variable geometry system of FIGS. 4-5 can be configured to provide adjustability to engine cycle changes and to provide just enough pressure difference across the HX components 60, 62 to enable a desired and/or required amount of cooling.

Figure 7:
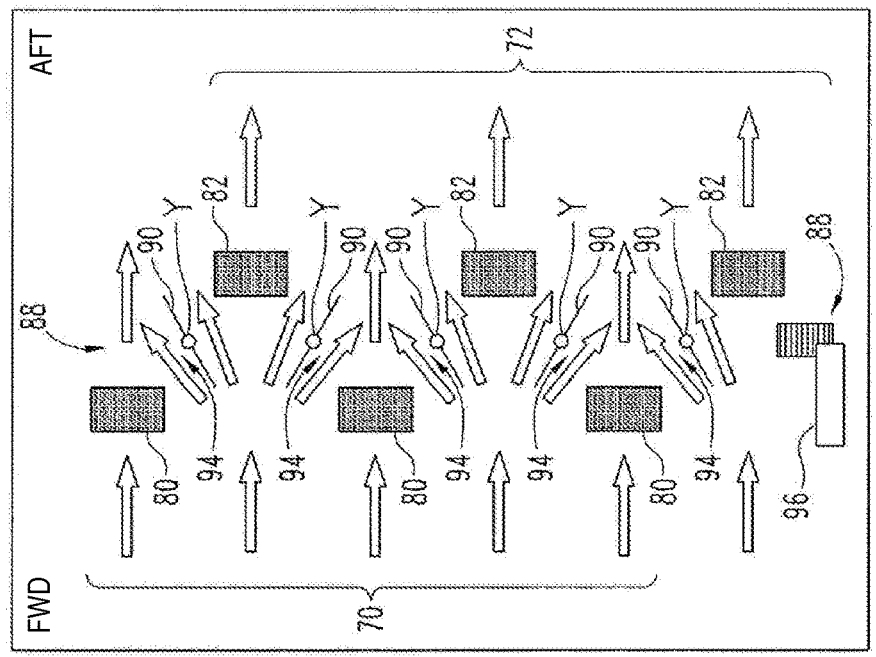
FIG. 7 is a schematic showing the FIG. 6 arrangement, with the fluid flow passage doors in an open state.
Figure 6:
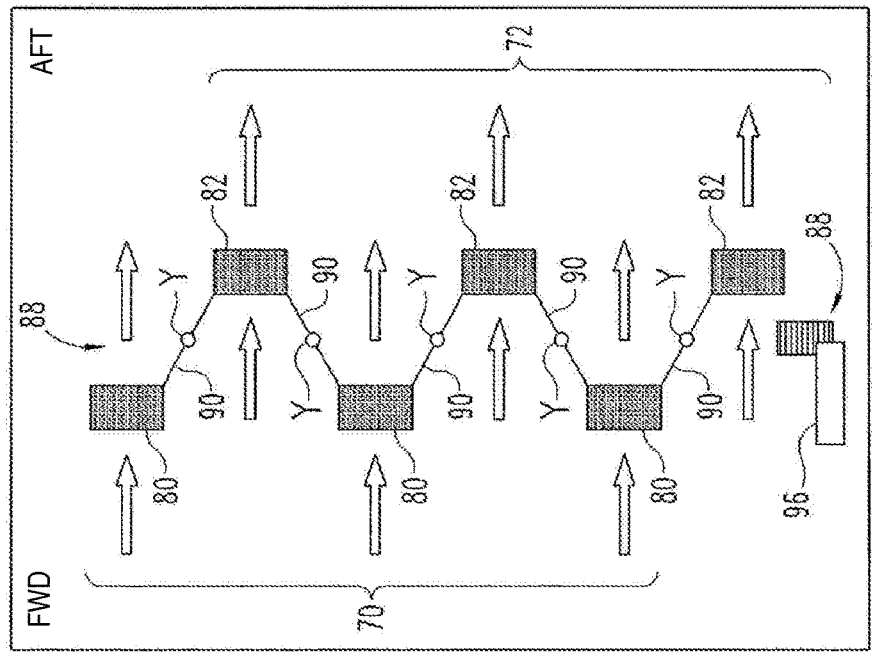
FIG. 6 is a schematic showing an outer diameter to engine centerline view of a sector of a gas turbine engine flow duct having integrated heat transfer components and a fluid flow passage door mechanism according to an embodiment, showing fluid flow passage doors in a closed state.

FIGS. 6 and 7 show first and second rows 70, 72 of HX components 80, 82, and a movable vane or door assembly 88 for integration into for example the flow duct 16 of the gas turbine engine 10 according to an embodiment. The quantity and/or spacing of the HX components 80, 82 can be the same, or different, from that of the HX components 20, 22 of the FIG. 1 embodiment. The movable door assembly 88 includes a plurality of fluid flow passage doors 90 that in the depicted embodiment are rotatable about a radially projecting axis Y disposed generally between for example the outer diameter of the flow duct 16 and the inner diameter of the flow duct 16. The fluid flow passage doors 90 are rotatable between an open state as shown for example in FIG. 7, at which airflow can pass through intermediate fluid flow passages 94 defined between adjacent HX components 80, 82 of the respective first and second rows 70, 72, and a closed state as shown for example in FIG. 6, at which airflow is blocked or substantially inhibited from passing through the intermediate fluid flow passages 94. The movable door assembly 88 can include any suitable mechanical, electrical, or electromechanical device 96 (only partially shown in FIGS. 6 and 7), for example a motor driven gear arrangement, that is operative to drive the fluid flow passage doors 90 to the open and closed states or to any suitable angular position between the open and closed states.

The integration of multiple rows 70, 72 of HX components 80, 82 and an intermediate fluid flow passage adjustment capability into the flow duct 16 having an arrangement as shown for example in FIGS. 6-7 can be used for example to adjust the amount of heat rejection most suited for a particular application and/or engine cycle condition. For example, by moving the fluid flow passage doors 90 to the closed position as shown in FIG. 6, the intermediate fluid flow passages 94 are blocked and a greater amount of airflow passes through the HX components 80, 82, and therefore the heat rejection capacity of the HX components 80, 82 increases. This also can result in increased flow duct pressure losses and associated fuel burn penalty increases. On the other hand, for example, by moving the fluid flow passage doors 90 to the open position as shown in FIG. 7, some airflow passes through the intermediate fluid flow passages 94 and a less amount of airflow passes through the HX components 80, 82, and therefore the flow duct pressure loss decreases and the associated fuel burn penalty decreases. This also can result in reduced heat rejection capacity. The embodiment of FIGS. 6-7 thus provides for varying the geometry of the integrated HX components 80, 82 relative to the flow duct 16 and/or relative to each other in such a way as to selectively increase system heat rejection and/or decrease flow duct pressure losses and associated fuel burn penalty for a particular application, depending on operating conditions such as heat rejection requirements and engine operation requirements, and/or environmental conditions, as would occur to those skilled in the art. Thus, the variable geometry system of FIGS. 6-7 provides greater flexibility in adjusting to variable engine cycles and/or variable heat loads. For example, in one form, increasing pressure loss increases heat rejection for a given engine operating condition. In another form, when engine operating conditions change, the movable door assembly 88 can be moved to meet heat rejection requirements while minimizing the pressure losses. In one form, the variable geometry system of FIGS. 6-7 can be configured to provide adjustability to engine cycle changes and to provide just enough pressure difference across the HX components 80, 82 to enable a desired and/or required amount of cooling.

Figure 8:
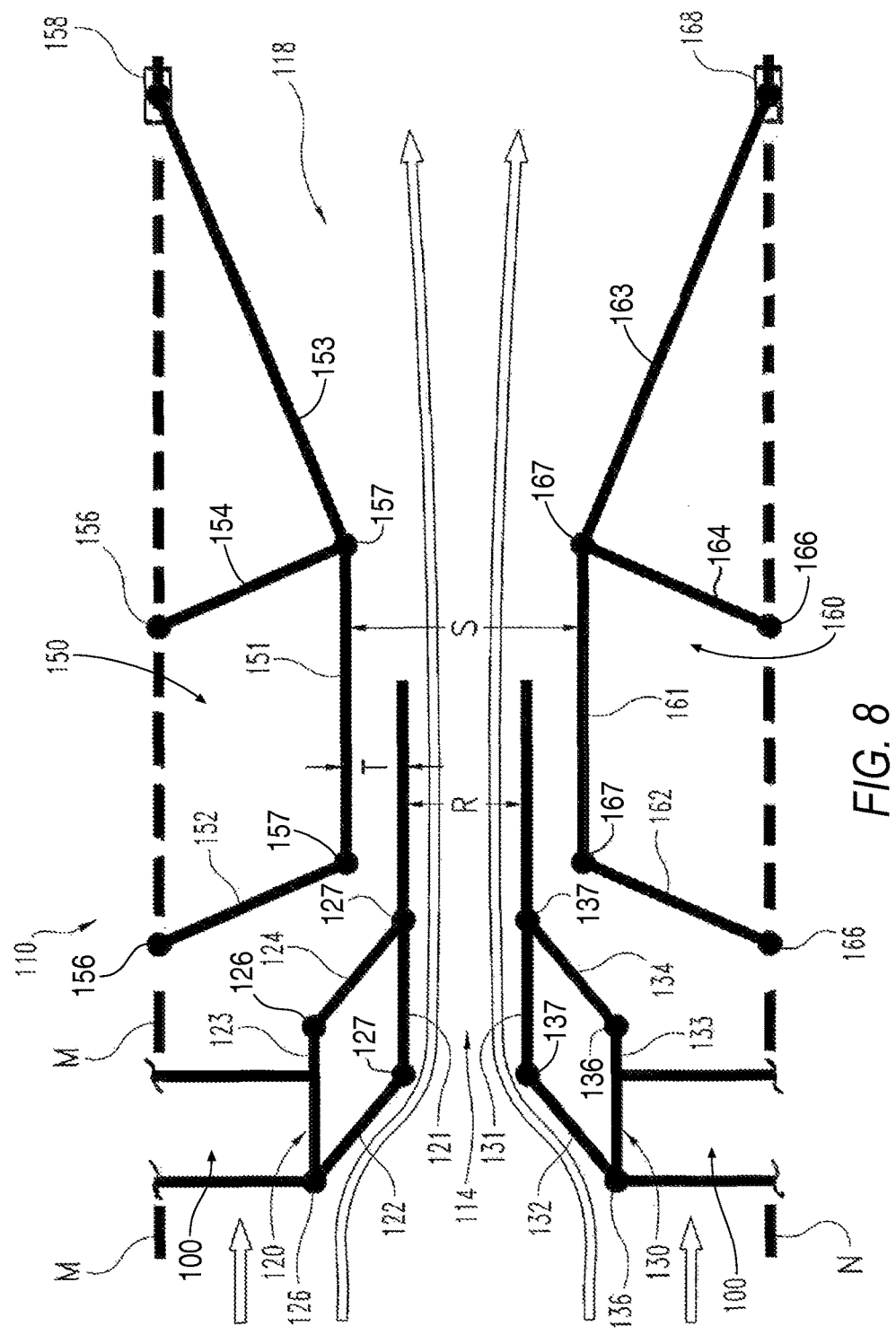
FIG. 8 is a schematic showing an outer diameter to engine centerline view of a sector of a gas turbine engine flow duct having integrated heat transfer components and ejector systems according to an embodiment.

Referring now to FIG. 8, multiple HX components 100 and ejector systems 110 can be integrated into for example the flow duct 16 of the gas turbine engine 10 according to an embodiment. The HX components 100 and ejector systems 110 can be circumferentially disposed about the engine centerline A of the gas turbine engine 10 (FIG. 1), and FIG. 8 is an outside diameter to engine centerline view that shows a single sector of the arrangement. In one form, axially extending lines M and N, shown respectively at the top and bottom of FIG. 8, can constitute a plane of cyclic symmetry such that for example half of a single HX component 100 is shown in the top left of FIG. 8 and half of a different, that is circumferentially adjacent, single HX component 100 is shown in the bottom left of FIG. 8. In one form, the arrangement shown in FIG. 8 can be repeated circumferentially about the engine centerline A.

The ejector systems 110 can have a forward section comprising an adjustable nozzle 114 disposed substantially between circumferentially adjacent HX components 100, and an aft section comprising an adjustable diffuser 118 disposed relatively downstream of the adjustable nozzle 114 and the HX components 100. In one form, the ejector system 110 may comprise a forward section adjustable nozzle 114 without the aft section adjustable diffuser 118, or with a different type of aft section component that realizes the functions of the aft section adjustable diffuser 118 described herein. The adjustable nozzle 114 is adjustable in a direction substantially transverse to the fluid flow path of the flow duct 16. In the depicted embodiment, the adjustable nozzle 114 is flanked on circumferentially opposite sides of the adjustable nozzle 114 by a first wall assembly 120 comprising four walls 121-124 and a second wall assembly 130 comprising four walls 131-134. The adjustable nozzle 114 is formed by the fluid surface walls 121, 122 of the first wall assembly 120 and the fluid surface walls 131, 132 of the second wall assembly 130.

The four walls 121-124 of the first wall assembly 120 form a four-body linkage in which the links, or bodies, are connected in a loop by two joints at reference numerals 126 and two joints at reference numerals 127. The four walls 131-134 of the second wall assembly 130 form a four-body linkage in which the links, or bodies, are connected in a loop by two joints at reference numerals 136 and two joints at reference numerals 137. The walls 123, 133 can be positioned circumferentially adjacent to the HX components 100, and can be fixed to, or fixed relative to, a support structure (not shown) of the radially inner and/or radially outer surface wall of the flow duct 16, or to other surrounding structure. The joints 126, 136 at opposite ends of the respective walls 123, 133 can be pivotally connected to the radially inner and/or radially outer surface walls of the flow duct 16, or to other surrounding structure. The joints 127, 137 at opposite ends of the respective walls 121, 131, along with the walls 121, 122, 124, and 131, 132, 134 in the illustrative embodiment are moveable within the radially inner and outer boundaries of the flow duct 16. As will be appreciated, the first and second wall assemblies 120,130 can be positioned relative to one another such that the walls 121, 131 can move in substantially parallel planes to increase and decrease the circumferential span R of the flow path of the adjustable nozzle 114, and the walls 122, 132 can move in mirrored fashion to form a converging path or adjustable narrowing taper extending aft to the walls 121, 131. Any suitable drive mechanism (not shown) can be used to drive the first and second wall assemblies 120, 130 to adjust the circumferential span R of the adjustable nozzle 114, as will be appreciated.

The adjustable diffuser 118 (if present) is disposed downstream of the adjustable nozzle 114 and the HX components 100. The adjustable diffuser 118, like the adjustable nozzle 114, is adjustable in a direction substantially transverse to the fluid flow path of the flow duct 16. In the depicted embodiment, the adjustable diffuser 118 is flanked on circumferentially opposite sides of the adjustable diffuser 118 by a first wall assembly 150 comprising three fluid surface walls 151-153 and a support member 154, and a second wall assembly 160 comprising three fluid surface walls 161-163 and a support member 164. The adjustable diffuser 118 is formed by the fluid surface walls 151-153 of the first wall assembly 150 and the fluid surface walls 161-163 of the second wall assembly 160.

The walls 151, 152 and the support member 154 of the first wall assembly 150, and the connecting structure (e.g. duct wall) between two joints at reference numerals 156, together form a four-body linkage in which the links, or bodies, are connected in a loop by the two joints 156 and two joints at reference numerals 157. The walls 161, 162 and the support member 164 of the second wall assembly 160, and the connecting structure (e.g. duct wall) between two joints at reference numerals 166, together form a four-body linkage in which the links, or bodies, are connected in a loop by the two joints 166 and two joints at reference numerals 167. The joints 156, 166 disposed along the respective axes M, N can be pivotally connected to the radially inner and/or outer surface walls of the flow duct 16, or to other surrounding structure. The joints 157, 167 at opposite ends of the respective walls 151, 161, along with the walls 151-153 and support member 154, and the walls 161-163 and support member 164 in the illustrative embodiment are movable within the radially inner and outer boundaries of the flow duct 16. The walls 153, 163 extend aft circumferentially outward toward the respective planes of cyclic symmetry M, N, at which a suitable sliding mechanism 158, 168 is provided to enable axial sliding movement of the aft end of the walls 153, 163. As will be appreciated, the first and second wall assemblies 150, 160 can be disposed relative to one another such that the walls 151, 161 can move in substantially parallel planes to increase and decrease the circumferential span S of the flow path of the adjustable diffuser 118, the walls 152, 162 can move in mirrored fashion to form a converging path or adjustable narrowing taper extending aft to the walls 151, 161, and the walls 153,163 can move in mirrored fashion to form an adjustable divergent channel or adjustable expanding taper extending aft from the walls 151, 161. Any suitable drive mechanism (not shown) can be used to drive the first and second wall assemblies 150, 160 in a manner to adjust the circumferential span S of the adjustable diffuser 118, as will be appreciated.

In the FIG. 8 embodiment, the aft end of the walls 121 and 131 of the adjustable nozzle 114 project into the forward end of the adjustable diffuser 118 between the walls 151 and 161 of the adjustable diffuser 118, and define a variable dimension T between the wall 121 of the adjustable nozzle 114 and the wall 151 of the adjustable diffuser 118, and between the wall 131 of the adjustable nozzle 114 and the wall 161 of the adjustable diffuser 118. As will be appreciated, the variable dimension T is a function of the movement of the adjustable nozzle 114 and the adjustable diffuser 118.

The integration of the variable geometry system of FIG. 8 into the flow duct 16 of the gas turbine engine 10 can be used for example to adjust the amount of heat rejection most suited for a particular application and/or engine cycle condition. For example, by adjusting the adjustable nozzle 114 to decrease the circumferential span R, the static pressure downstream of the HX components 100 decreases and a greater amount of airflow passes through the HX components 100, and therefore the heat rejection capacity of the HX components 100 increases. Furthermore, the adjustable diffuser 118 (if present) downstream of the adjustable nozzle 114 can be used to recover the dynamic pressure and thus reduce the pressure loss penalty in the flow duct 16. The amount of pressure recovery can be controlled for example by adjusting the adjustable diffuser 118 relative to the adjustable nozzle 114 by varying the dimension T. The embodiment of FIG. 8 thus provides for varying the geometry of the integrated adjustable nozzles 114 and the adjustable diffusers 118 relative to the HX components 100 and/or the flow duct 16 in such a way as to selectively increase the system heat rejection and/or decrease the flow duct pressure losses and associated fuel burn penalty for a particular application, depending on operating conditions such as heat rejection requirements and engine operation requirements, and/or environmental conditions, as would occur to those skilled in the art. Thus, the variable geometry system of FIG. 8 provides greater flexibility in adjusting to variable engine cycles and/or variable heat loads. For example, in one form, increasing pressure loss increases heat rejection for a given engine operating condition. In another form, when engine operating conditions change, the ejector systems 100 can be actuated to meet heat rejection requirements while minimizing the pressure losses. In one form, the variable geometry system of FIG. 8 can be configured to provide adjustability to engine cycle changes and to provide just enough pressure difference across the HX components 100 to enable a desired and/or required amount of cooling. In one form, the adjustable nozzle 114 can serve as a flow restriction device, for example at the nozzle flow path R, to create more pressure difference across the HX components 100, and the adjustable diffuser 118 can serve as a dynamic pressure recovery device to recover the dynamic pressure passing through the nozzle path R to minimize overall system pressure losses.

Figure 9:
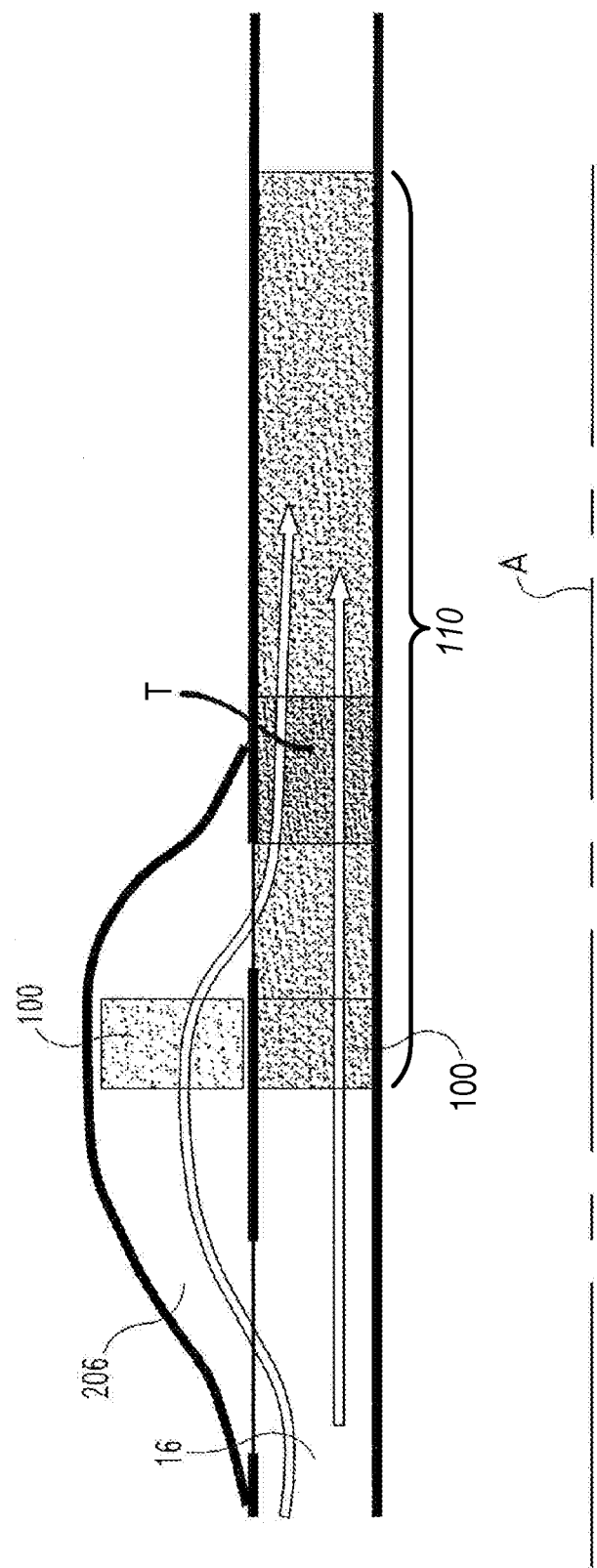
FIG. 9 is an axial section schematic showing the arrangement of the heat transfer components of FIG. 8 integrated in various fluid stream locations according to an embodiment.

Referring to FIG. 9, in an embodiment, the HX components 100 and the ejector systems 110 can be immersed in the flow duct 16. As described above, the immersed adjustable nozzle 114 of the ejector system 110 can be used to lower the static pressure to obtain a greater amount of airflow through the HX components 100 while the adjustable diffuser 118 can be used to recover pressure. In another embodiment, also shown in FIG. 9, HX components 100 can be immersed in a bulbous passage or flow duct 206 that is radially external to the flow duct 16 and is disposed for example in available engine bay space to provide for example easier access to the HX components 100. In still another embodiment, the HX components 100 can be disposed in both the flow duct 16 and the radially external passage 206. In one form, the radially external passage 206 spreads out the air stream to provide more room for placing heat exchangers 100. Further, the radially external passage 206 is not limited to the bulbous shape and configuration depicted in FIG. 9. For example, the radially external passage 206 can extend from the forward to the aft of the gas turbine engine 10 and movable walls may be incorporated to transfer airflow to and from the flow duct 16.

Figure 10A:
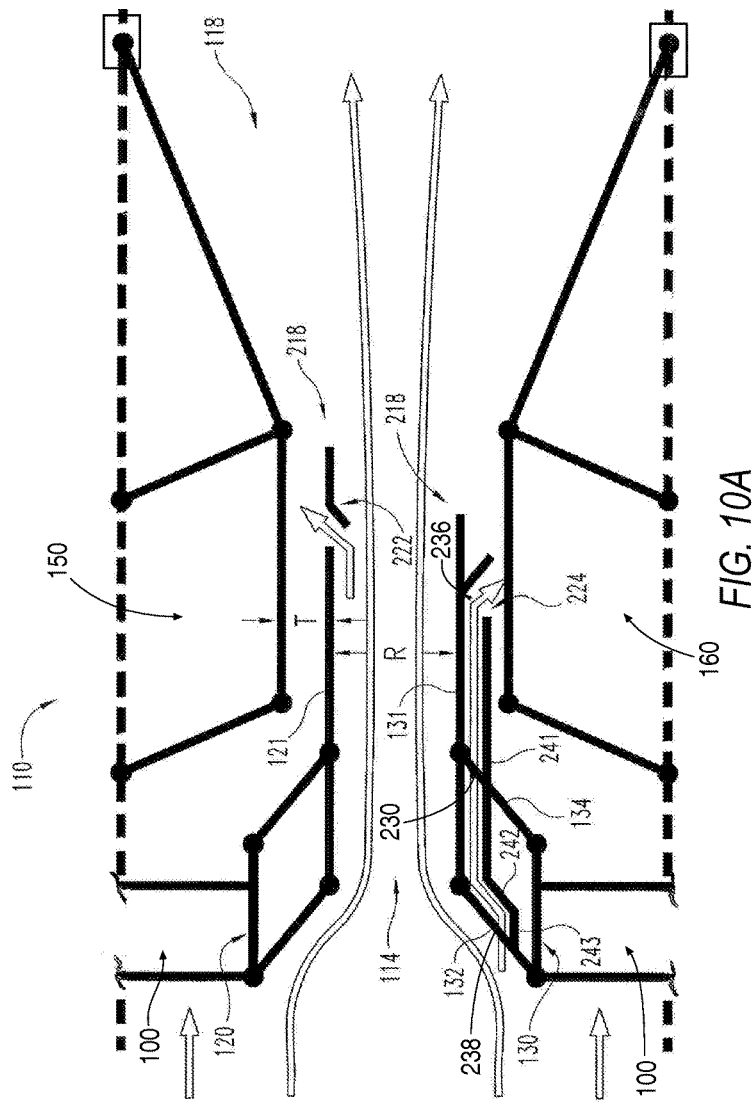
FIG. 10A is a schematic showing an outer diameter to engine centerline view of a sector of a gas turbine engine flow duct having integrated heat transfer components, ejector systems, and fluid flow injection systems according to an embodiment.

FIG. 10A is an embodiment similar to that of the FIG. 8 embodiment, and further including a fluid flow injection system 218. The fluid flow injection system 218 can inject air into the adjustable diffuser 118 of the ejector system 110 to reduce flow separation in the adjustable diffuser 118. The fluid flow injection system 218 depicted in the FIG. 10A arrangement includes for example a scoop 222 and/or a passage 224, which can be used together or singly to produce a high velocity fluid stream to energize the flow coming from the downstream end of the HX component 100 and to reduce the flow separation in the adjustable diffuser 118. In this way, the scoop 222 and/or passage 224 of the fluid flow injection system 218 can be used to improve pressure recovery.

The scoop 222 can be integrated with and disposed at the aft end of the wall 121 of the adjustable nozzle 114. The passage 224 can take air from a high pressure location, for example from the upstream end of the adjustable nozzle 114 and transfer the air to for example a location near the start of the adjustable diffuser 118. Thus, for example, the passage 224 can extend aft from opening 228 to opening 230 integrated in respective walls 132 and 134 of the adjustable nozzle 114, and to an opening 236 integrated with and disposed at the aft end of the wall 131 of the adjustable nozzle 114. As will be appreciated, the passage 224 can be bordered on one side by the walls 132 and 131 of the adjustable nozzle 114 and at an opposing side by corresponding walls 241-243.

The integration of the fluid flow injection system 218 with respect to the HX components 100 and the ejector systems 110 of the FIG. 10A embodiment is not limited to the arrangement as shown. In an embodiment, the fluid flow injection system 218 can be located elsewhere in the adjustable diffuser 118, for example further downstream from that which is shown in FIG. 10A, as may be suitable for an application. In one form, the fluid flow injection system 218 may comprise scoops 222 and no passages 224. In another form, the fluid flow injection system 218 may comprise passages 224 and no scoops 222. Further, the fluid flow injection system 218 is not limited to its high pressure source being from the upstream end of the adjustable nozzle 114; the fluid flow injection system 218 can use any suitable higher pressure air source(s), for example a high pressure air source from the gas turbine engine 10.

Figure 10B:
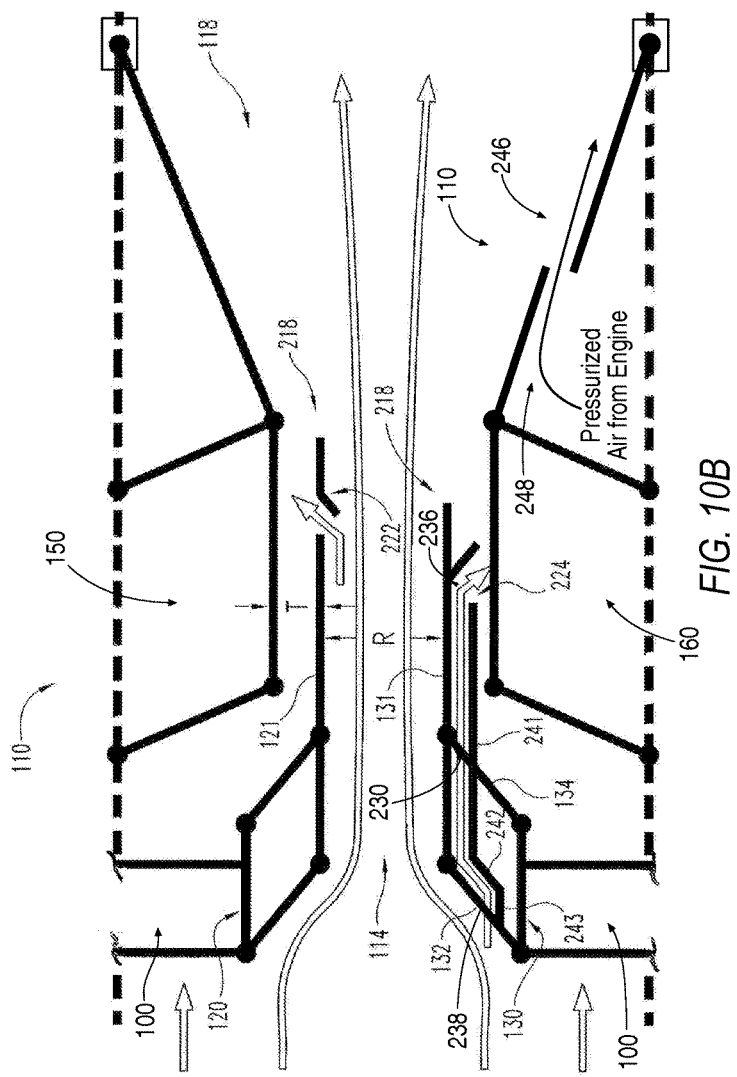
FIG. 10B is a schematic showing a portion of an ejector system of a FIG. 10 gas turbine engine flow duct according to an embodiment.
Figure 10C:
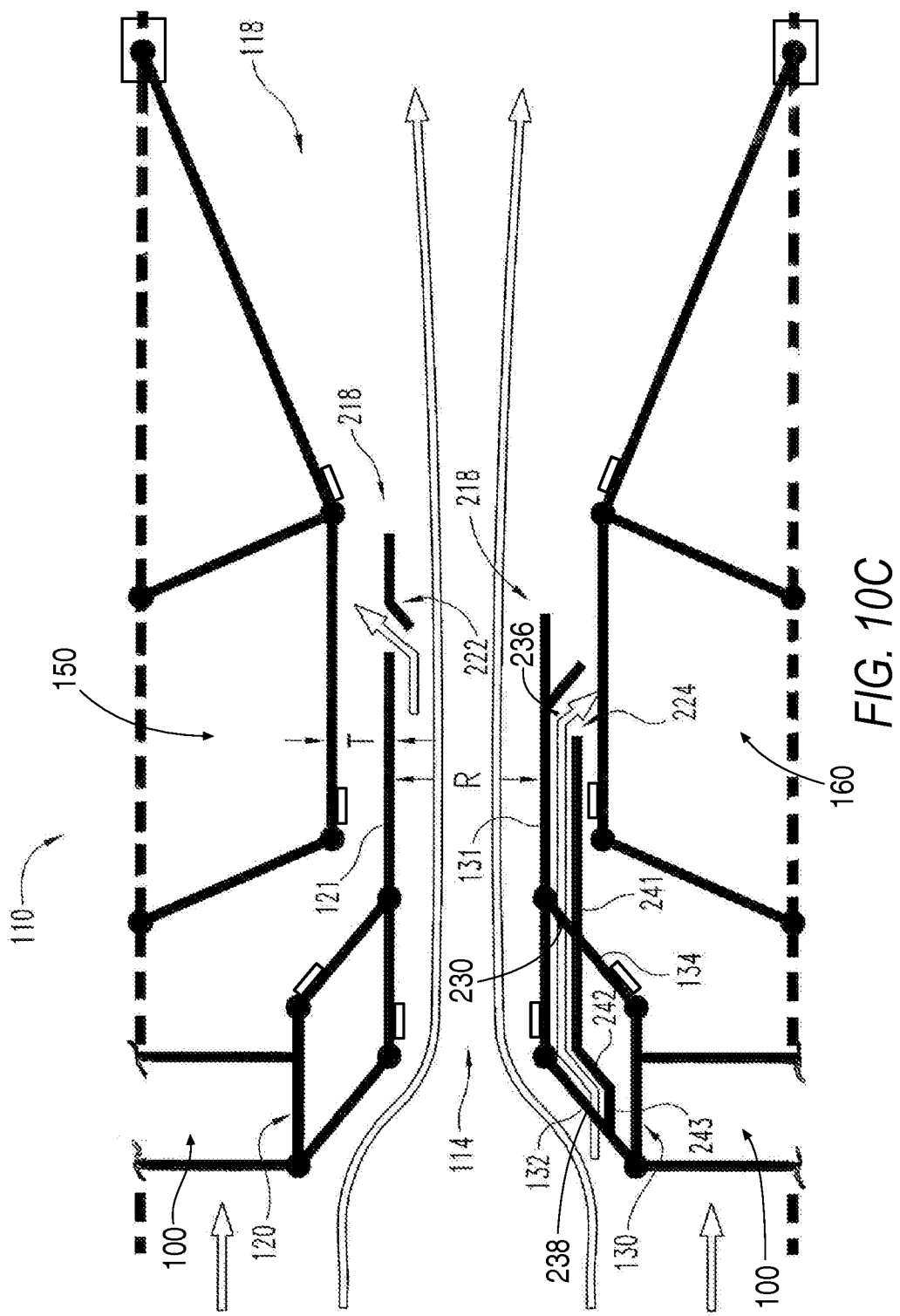
FIG. 10C is a schematic showing a portion of an ejector system of a FIG. 10 gas turbine engine flow duct according to an embodiment.

FIG. 10B shows an aft portion of the ejector system 110 that includes an alternative and/or additional fluid flow injection site 246, in which pressurized air from the engine is injected through a passage 248 of the ejector system 110. As will be appreciated, any suitable flow control means may be employed, including for example any of a family of plasma actuators. FIG. 10C, for example, shows locations of plasma actuators 249 for flow control in any of the flow duct embodiments of FIG. 8, FIG. 10A, or FIG. 10B, or other flow duct embodiments described herein.

Figure 11:
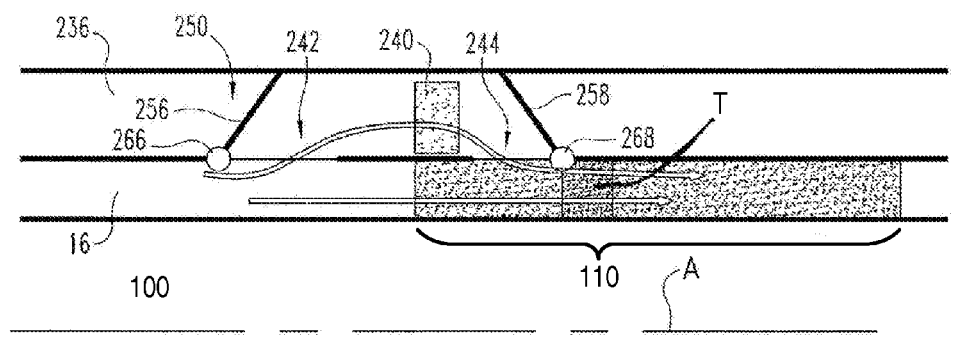
FIG. 11 is an axial section schematic showing inner and outer flow ducts of a gas turbine engine, heat transfer components and upstream and downstream fluid flow passage doors according to an embodiment, with the upstream and downstream fluid flow passage doors in an open state.
Figure 12:
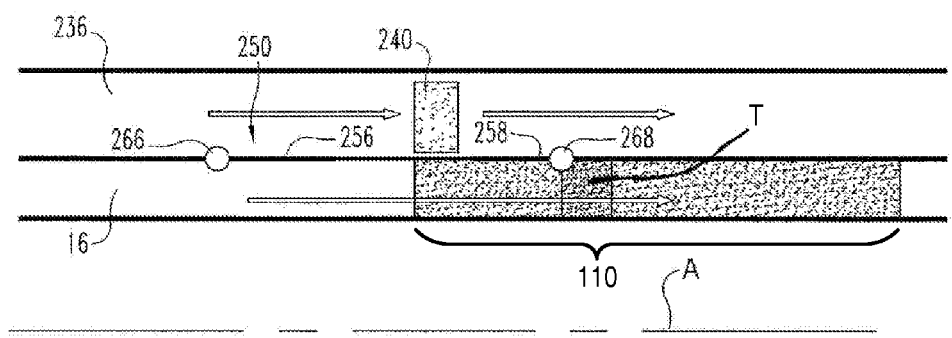
FIG. 12 is a schematic showing the FIG. 11 arrangement, with the upstream and downstream fluid flow passage doors in a closed state.

FIGS. 11 and 12 show an arrangement of inner and outer flow ducts 16, 236, HX components 240, and a movable vane or door assembly 250, for integration into for example the gas turbine engine 10 according to an embodiment. The movable door assembly 250 enables selection of an air stream to be used for the cold side of the HX component 240, as will be described in greater detail below.

The inner flow duct 16 can be an annular bypass flow duct that surrounds the core of the gas turbine engine 10, such as described with respect to the FIG. 1 embodiment. Ejector systems 110 can be integrated into the inner flow duct 16, such as in the manner described with respect to the FIG. 8 embodiment. The outer flow duct 236 can be an annular flow duct that surrounds the inner flow duct 16, for example an annular ram air flow duct. In one form, the outer flow duct 236, for example as a ram air flow duct, can collect air from the inlet of the gas turbine engine 10, which can then be exhausted into an exhaust nozzle of the gas turbine engine 10 or to a port on an aircraft surface with which the outer flow duct 236 is in fluid communication. As will be appreciated, the flow ducts 16, 236 can be configured for low observable (LO) requirements suited for an application.

The HX components 240 (one shown in FIGS. 11 and 12) can be integrated into the outer flow duct 236 in a circumferentially disposed manner about the engine centerline A. Radially projecting fluid flow passages 242, 244 are provided respectively upstream and downstream of the HX component 240 and enable fluid communication between the flow duct 16 and the flow duct 236.

The movable door assembly 250 can be integrated in, relative to, and/or between the outside diameter wall of the inner flow duct 16 and/or the inside diameter wall of the outer flow duct 236. The movable door assembly 250 includes an upstream fluid flow passage door 256 and a downstream fluid flow passage door 258 that are pivotable about respective hinges 266, 268 between an open state as shown for example in FIG. 11 and a closed state as shown for example in FIG. 12. With both doors 256, 258 in the open state, airflow in the inner flow duct 16 can pass through the fluid flow passage 242 to the outer flow duct 236 and to the cold side of the HX component 240 and from the downstream end of the HX component 240 through the fluid flow passage 244 back to the inner flow duct 16, with the aid of the ejector system 110 or similar device that serves to provide reduced-flow cross-sectional area or otherwise modify the flow areas of the flow duct 16 to reduce static pressure, but airflow in the outer flow duct 236 is blocked or substantially inhibited from passing through the outer flow duct 236 to the cold side of the HX component 240. With both doors 256, 258 in the closed state, airflow in the outer flow duct 236 can pass through the outer flow duct 236 to the cold side of the HX component 240 and further downstream in the outer flow duct 236, and airflow in the inner flow duct 16 can pass through the inner flow duct 16 but is blocked or substantially inhibited from passing through the fluid flow passage 242 to the outer flow duct 236 and to the cold side of the HX component 240. The movable door assembly 250 can include any suitable mechanical, electrical, or electromechanical device (not shown), for example a motor driven gear arrangement, that is operative to pivot the fluid flow passage doors 256, 258 to the open and closed states or to an angular position between the open and closed states.

The movable door assembly 250 can be used to select the airflow of the inner flow duct 16 or the airflow of the outer flow duct 236 for example to adjust the amount of heat rejection most suited for a particular application and/or engine cycle condition. For example, in some applications, the fluid flow passage doors 256, 258 can be moved to the open state (FIG. 11) so that airflow in the inner flow duct 16 is conveyed through the fluid flow passage 242 to the outer flow duct 236 and to the cold side of the HX component 240. In other applications, for example in high Mach applications where fluid temperatures in the inner flow duct 16 become too hot for a particular application, the fluid passage doors 256, 258 can be moved to the closed state (FIG. 12) so that airflow in the flow duct 16 is blocked or substantially inhibited from the HX component 240 and instead airflow in the flow duct 236 is conveyed to the cold side of the HX component 240. In one form, by switching the cold side heat sink, the vehicle's Mach number operating range for a cooling system can be extended.

Figure 13:
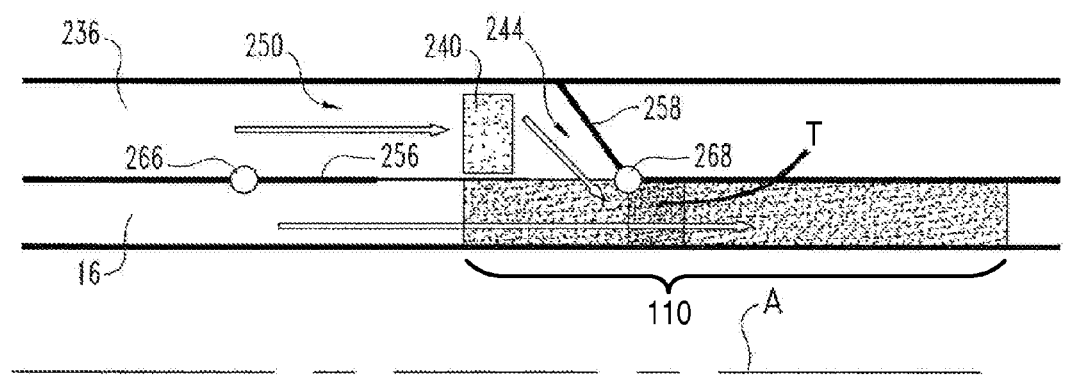
FIG. 13 is a schematic showing the FIG. 11 arrangement, with the upstream fluid flow passage door in a closed state and the downstream fluid flow passage door in an open state.

FIG. 13 is another example of a use of the movable door assembly 250 to control air streams of the inner and outer flow ducts 16, 236 to adjust the amount of heat rejection suitable for a particular application and/or engine condition. Here, the upstream fluid flow passage door 256 is moved to a closed state and the downstream fluid flow passage door 258 is moved to an open state. As such, airflow in the inner flow duct 16 passes through the inner flow duct 16, and airflow in the outer flow duct 236 passes to the cold side of the HX component 240, through the HX component 240, and downstream from the HX component 240, at which the fluid flow passage door 258 conveys the airflow through the fluid flow passage 244 to the inner flow duct 16. Thus, the arrangement of FIG. 13 can be used for example to lower the static pressure in the airstream of the inner flow duct 16, with the aid of the ejector system 110 or similar device that serves to provide reduced-flow cross-sectional area or otherwise modify the flow areas of the flow duct 16 to reduce static pressure, so that ram air in the outer flow duct 236 can be pulled through the HX component 240. The inner and outer flow ducts 16, 236 are not limited to the configuration shown in FIG. 13, and other embodiments are contemplated. For example, in an embodiment, a portion of the outer flow duct 236 downstream from the fluid flow passage door 258 can be eliminated at the aft end of the gas turbine engine 10.

FIGS. 14 to 18 show an arrangement of inner and outer flow ducts 16, 336, HX components 340, and a rotatable duct assembly 350, for integration into for example the gas turbine engine 10 according to an embodiment. The rotatable duct assembly 350 enables selection of an air stream to be used for the cold side of the HX component 340, as will be described in greater detail below.

The inner flow duct 16 can be an annular bypass flow duct that surrounds the core of the gas turbine engine 10, such as described with respect to the FIG. 1 embodiment. Ejector systems 110 can be integrated into the inner flow duct 16 (shown only with respect to FIGS. 15 to 18 for purposes of ease and clarity of description), such as in the manner described with respect to the FIG. 8 embodiment. The outer flow duct 336 can be an annular flow duct that surrounds the inner flow duct 16, for example an annular ram air flow duct. In one form, the outer flow duct 336, for example as a ram air flow duct, can collect air from the inlet of the gas turbine engine 10, which can then be exhausted into an exhaust nozzle of the gas turbine engine 10 or to a port on an aircraft surface with which the outer flow duct 336 is in fluid communication. As will be appreciated, the flow ducts 16, 336 can be configured for low observable (LO) requirements suited for an application.

The HX components 340 (only one shown in FIGS. 15 to 18 for ease and clarity of description) can be integrated into the outer flow duct 336 in a circumferentially disposed manner about the engine centerline A, as will be appreciated. The rotatable duct assembly 350 is selectively rotatable to enable fluid communication between the inner flow duct 16 and the outer flow duct 336.

Figure 14:
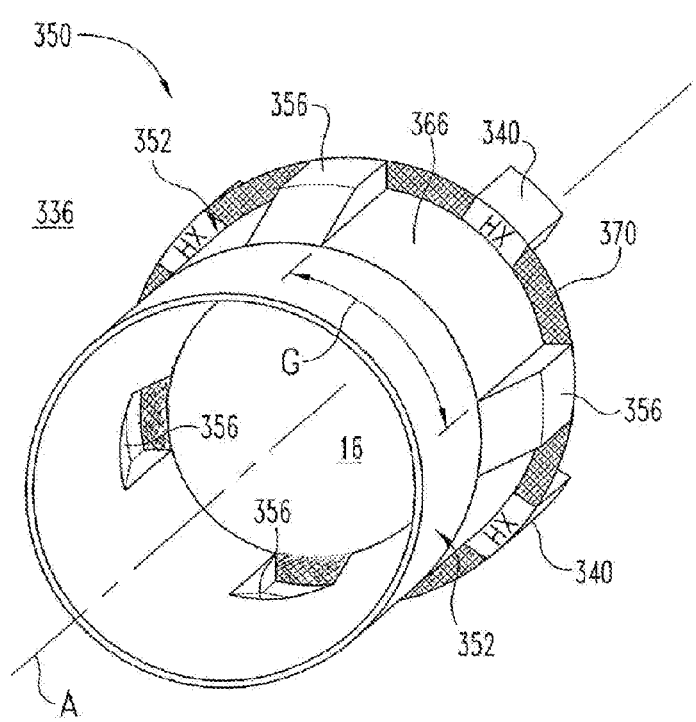
FIG. 14 is a forward looking aft schematic showing an arrangement of heat transfer components integrated with upstream and downstream rotatable cylinder fluid flow passage assemblies according to an embodiment.

The rotatable duct assembly 350 can be integrated in, relative to, and/or between the outside diameter wall of the inner flow duct 16 and/or the inside diameter wall of the outer flow duct 336. The rotatable duct assembly 350 includes upstream and downstream rotatable cylinder fluid flow duct assemblies 352,354 disposed respectively axially upstream and downstream of the row of HX components 340. Each assembly 352, 354 is rotatable about the engine centerline A of the gas turbine engine 10, and comprises a rotatable cylinder 366, 368 and a plurality of circumferentially disposed fluid flow ducts 356, 358 projecting radially from the cylinder 366, 368 and spaced apart in alternating fashion by gaps G. As shown in FIG. 14, the rotatable duct assembly 350 further includes a flow barrier 370 disposed in the outer flow duct 336 circumferentially about the engine centerline A between circumferentially adjacent HX components 340. For purposes of ease and clarity of description, FIG. 14 shows only the upstream rotatable cylinder fluid flow duct assembly 352; the downstream rotatable cylinder fluid flow duct assembly 352 can be similarly configured, as is apparent from FIGS. 15 to 18 and the description relating to FIGS. 15 to 18.

In the illustrative embodiment, the upstream rotatable cylinder fluid flow duct assembly 352 can be selectively rotated so that the fluid flow duct 356 is axially aligned, that is in registry with, the HX component 340, or axially out-of-alignment with the HX component 340. When the fluid flow duct 356 is in axial alignment with the HX component 340, the fluid flow duct 356 opens fluid communication from the inner flow duct 16 to the cold side of the HX component 340 and closes off fluid communication from the outer flow duct 336 to the cold side of the HX component 340. When the fluid flow duct 356 is axially out-of-alignment with the HX component 340, the flow barrier 370 blocks, that is closes, fluid communication from the inner flow duct 16 to the cold side of the HX component 340, and the gaps G between the circumferentially spaced fluid flow ducts 356 allow fluid communication from the outer flow duct 336 to the cold side of the HX component 340. The downstream rotatable cylinder fluid flow duct assembly 354 (not shown in FIG. 14) operates in a similar manner to selectively open and block off fluid communication, the fluid communication being from the HX component 340 to the inner flow duct 16 or the downstream portion of the outer flow duct 336.

Figure 15:
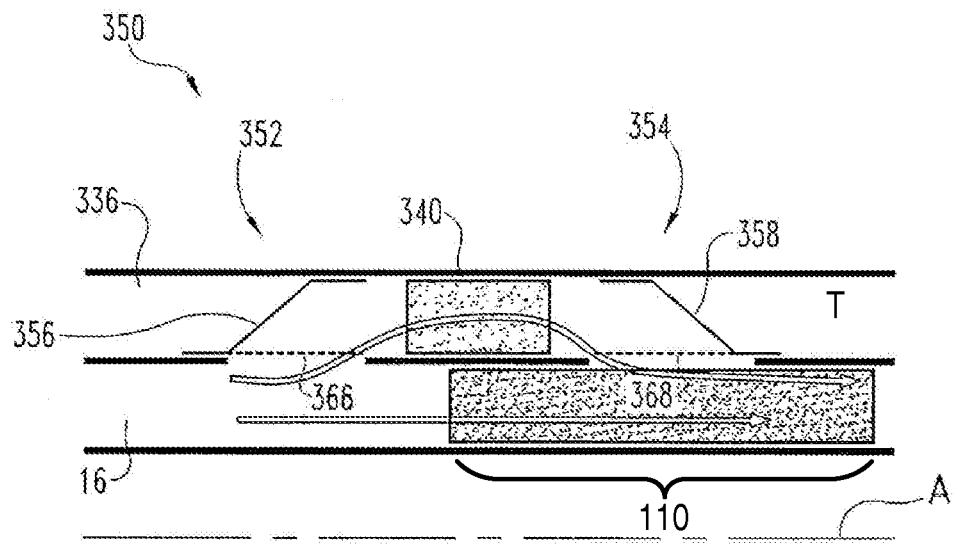
FIG. 15 is a schematic showing the FIG. 14 arrangement, with the upstream and downstream rotatable cylinder fluid flow passage assemblies in an open state.
Figure 16:
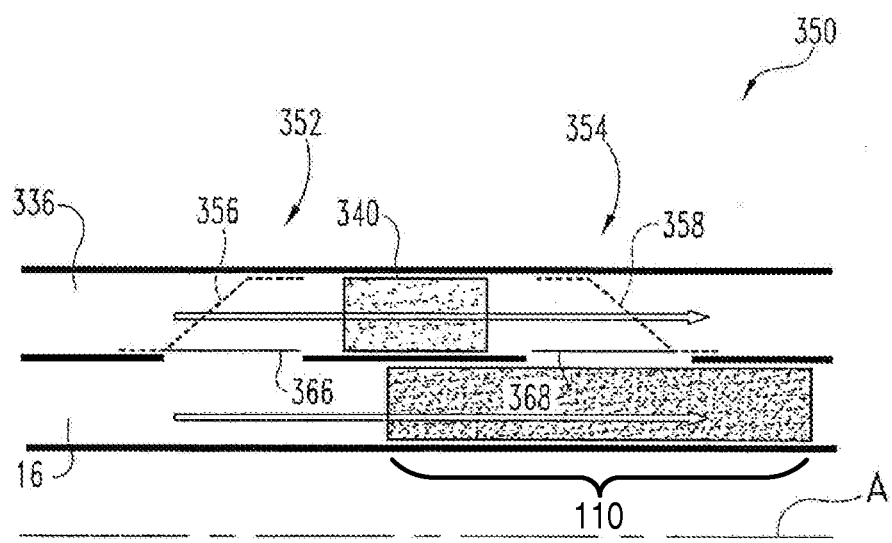
FIG. 16 is a schematic showing the FIG. 14 arrangement, with the upstream and downstream rotatable cylinder fluid flow passage assemblies in a closed state.

Referring to FIG. 15, with both the upstream and downstream rotatable cylinder fluid flow duct assemblies 352, 354 in an open state" that is with their respective fluid flow ducts 356, 358 in alignment with the HX component 340 on opposite sides thereof, airflow in the inner flow duct 16 can pass through the fluid flow duct 356 to the cold side of the HX component 340 and from the downstream end of the HX component 340 back to the inner flow duct 16, with the aid of the ejector system 110 or similar device that serves to provide reduced-flow cross-sectional area or otherwise modify the flow areas of the flow duct 16 to reduce static pressure, but airflow in the outer flow duct 336 is blocked from passing through the outer flow duct 336 to the cold side of the HX component 340. Referring to FIG. 16, with both the upstream and downstream rotatable cylinder fluid flow duct assemblies 352, 354 in the closed state, that is with their respective fluid flow ducts 356, 358 out-of-alignment with the 11X component 340 on opposite sides thereof, airflow in the outer flow duct 336 can pass through the outer flow duct 336 to the cold side of the FIX component 340 and further downstream in the outer flow duct 336, and airflow in the inner flow duct 16 can pass through the inner flow duct 16 but is blocked from passing through the fluid flow duct 356 to the cold side of the HX component 340. The rotatable duct assembly 350 can include any suitable mechanical, electrical, or electromechanical device (not shown), for example a motor driven gear arrangement, that is operative to rotate the upstream and downstream rotatable cylinder fluid flow duct assemblies 352, 354 to the open and closed states or to an angular position between the open and closed states.

The rotatable duct assembly 350 can be used to select the airflow of the inner flow duct 16 or the airflow of the outer flow duct 336 for example to adjust the amount of heat rejection most suited for a particular application and/or engine cycle condition. For example, in some applications, the fluid flow ducts 356, 358 can be rotated to the open state (FIG. 15) so that airflow in the inner flow duct 16 is conveyed to the cold side of the HX component 340. In other applications, for example in high Mach applications where fluid temperatures in the inner flow duct 16 get too hot, the fluid flow ducts 356, 358 can be rotated to the closed state (FIG. 16) so that airflow in the inner flow duct 16 is blocked from the cold side of the HX component 340 and instead airflow in the outer flow duct 336 is conveyed to the cold side of the HX component 340. In one form, by switching the cold side heat sink, the vehicle's Mach number operating range for a cooling system can be extended.

Figure 17:
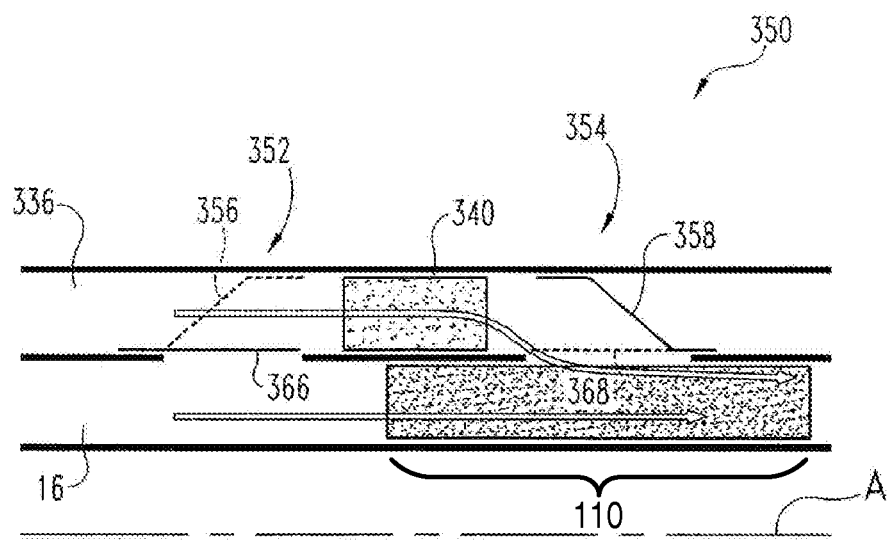
FIG. 17 is a schematic showing the FIG. 14 arrangement, with the upstream rotatable cylinder fluid flow passage assembly in a closed state and the downstream rotatable cylinder fluid flow passage assembly in an open state.
Figure 18:
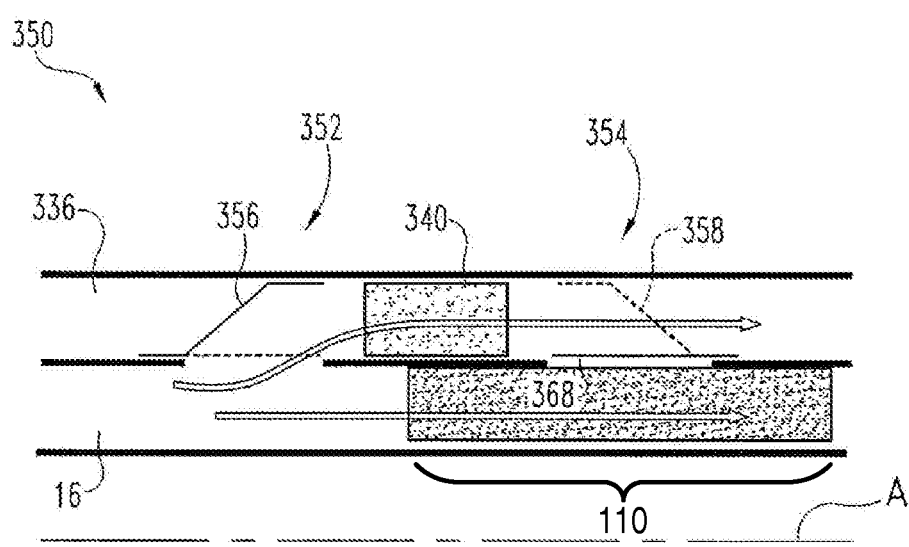
FIG. 18 is a schematic showing the FIG. 14 arrangement, with the upstream rotatable cylinder fluid flow passage assemblies in an open state and the downstream rotatable cylinder fluid flow passage assemblies in a closed state.

FIGS. 17 and 18 show other examples or modes of operation of the rotatable duct assembly 350 to control air streams of the inner and outer flow ducts 16, 336 to adjust the amount of heat rejection suitable for a particular application and/or engine condition. In FIG. 17, the upstream rotatable cylinder fluid flow duct assembly 352 is rotated to a closed state and the downstream rotatable cylinder fluid flow duct assembly 354 is rotated to an open state. As such, airflow in the inner flow duct 16 passes through the inner flow duct 16, and airflow in the outer flow duct 336 passes to the cold side of the HX component 340, through the HX component 340, and downstream from the HX component 340 to the fluid flow duct 358, which conveys the airflow to the inner flow duct 16. Thus, the arrangement of FIG. 17 can be used for example to lower the static pressure in the airstream of the inner flow duct 16, with the aid of the ejector system 110 or similar device that serves to provide reduced-flow cross-sectional area or otherwise modify the flow areas of the flow duct 16 to reduce static pressure, so that ram air in the outer flow duct 336 can be pulled through the HX component 340. The inner and outer flow ducts 16, 336 are not limited to the configuration shown in FIG. 17, and other embodiments are contemplated. For example, in an embodiment, a portion of the outer flow duct 336 downstream from the fluid flow duct 358 can be eliminated at the aft end of the gas turbine engine 10.

In the FIG. 18 mode of operation, the upstream rotatable cylinder fluid flow duct assembly 352 is rotated to an open state and the downstream rotatable cylinder fluid flow duct assembly 354 is rotated to a closed state. As such, airflow in the inner flow duct 16 passes through the fluid flow duct 356 to the cold side of the HX component 340 and from the downstream end of the HX component 340 to further downstream in the outer flow duct 336, and airflow in the outer flow duct 336 is blocked from passing through the outer flow duct 336 to the cold side of the HX component 340. The inner and outer flow ducts 16, 336 are not limited to the configuration shown in FIG. 18, and other embodiments are contemplated.

Although the variable geometry configuration of HX components has been described herein as having applicability to gas turbine engines, it will be appreciated that other applications may also be suitable.

Any theory, mechanism of operation, proof, or finding stated herein is meant to further enhance understanding of embodiment of the present invention and is not intended to make the present invention in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected.

What is claimed is:

1. A flow duct for a gas turbine engine comprising:
the flow duct disposed along a centerline of the gas turbine engine and defining a stream flow passage;
first and second rows of heat exchangers disposed along the engine centerline of the gas turbine engine and integrated in the flow duct in fluid communication with the stream flow passage of the flow duct; and
an adjustable nozzle positioned within the flow duct, the adjustable nozzle having a first nozzle wall assembly and a second nozzle wall assembly that define a nozzle span, such that air passing through the flow duct passes through the nozzle span;

wherein:
the first nozzle wall assembly includes a first nozzle wall and the second nozzle wall assembly includes a second nozzle wall; and
the first and second nozzle wall assemblies are each adjustable to define the nozzle span between the first nozzle wall and the second nozzle wall;
further comprising an adjustable diffuser downstream of the adjustable nozzle, the adjustable diffuser including a first diffuser wall assembly and a second diffuser wall assembly, the first diffuser wall assembly having a first diffuser wall and the second diffuser wall assembly having a second diffuser wall, wherein the first and second diffuser wall assemblies are each adjustable to adjust a diffuser span between the first diffuser wall and the second diffuser wall;
wherein each of the first and second nozzle wall assemblies are four-body linkages, each having pivotal joints that adjust the nozzle span between the first nozzle wall and the second nozzle wall; and
wherein each of the first and second diffuser wall assemblies are four-body linkages, each having pivotal joints that adjust the diffuser span between the first diffuser wall and the second diffuser wall.

2. The flow duct of claim 1 in which the flow duct is an annular bypass flow duct that surrounds a core of the gas turbine engine.

3. The flow duct of claim 1 in which the flow duct comprises a ram air duct.

4. The flow duct of claim 1 in which the heat exchangers of the first row are circumferentially disposed about the engine centerline at a first radial distance from the engine centerline, and the heat exchangers of the second row are circumferentially disposed about the engine centerline at a second radial distance from the engine centerline.

5. The flow duct of claim 1 in which the heat exchangers of the first row are angularly offset from the heat exchangers of the second row.

6. The flow duct of claim 1, further comprising a scoop positioned aft of the first nozzle wall, the scoop positioned to transfer air passing through the nozzle span to a location near a start of the adjustable diffuser.

7. A flow duct for a gas turbine engine comprising:
the flow duct disposed along a centerline of the gas turbine engine and defining a flow duct passage;
a plurality of heat transfer components integrated in the flow duct and configured to have a variable geometry arrangement for adjusting static pressure in the flow duct passage downstream of the heat transfer components; and
an adjustable nozzle positioned within the flow duct, the adjustable nozzle having a first nozzle wall assembly and a second nozzle wall assembly that define a nozzle span, such that air passing through the flow duct passes through the nozzle span;
wherein:
the first nozzle wall assembly includes a first nozzle wall and the second nozzle wall assembly includes a second nozzle wall; and
the first and second nozzle wall assemblies are each adjustable to define the nozzle span between the first nozzle wall and the second nozzle wall;
further comprising an adjustable diffuser positioned downstream of the adjustable nozzle, the adjustable diffuser including a first diffuser wall assembly and a second diffuser wall assembly, the first diffuser wall assembly having a first diffuser wall and the second diffuser wall assembly having a second diffuser wall, wherein the first and second diffuser wall assemblies are each adjustable to adjust a diffuser span between the first diffuser wall and the second diffuser wall;
wherein each of the first and second nozzle wall assemblies are four-body linkages, each having pivotal joints that adjust the nozzle span between the first nozzle wall and the second nozzle wall; and
wherein each of the first and second diffuser wall assemblies are four-body linkages, each having pivotal joints that adjust the diffuser span between the first diffuser wall and the second diffuser wall.

8. The flow duct of claim 7 in which the variable geometry arrangement of heat transfer components includes first and second rows of heat transfer components in fluid communication with the flow duct passage of the flow duct, wherein the first and second rows of heat transfer components are relatively axially adjustable along the engine centerline of the gas turbine engine.

9. The flow duct of claim 7 in which the variable geometry arrangement of heat transfer components includes the heat transfer components and nozzle components circumferentially disposed about the engine centerline.

10. The flow duct of claim 7 in which the variable geometry arrangement of heat transfer components includes the heat transfer components and ejectors circumferentially disposed about the engine centerline, in which the ejector comprises the adjustable nozzle and an adjustable diffuser disposed along the engine centerline.

11. The flow duct of claim 7 in which the flow duct comprises an outer flow duct that surrounds an inner flow duct, and the inner flow duct surrounds a core of the gas turbine engine.

12. A method of adjusting pressure distribution in a flow duct for a gas turbine engine, the flow duct having heat exchangers comprising:
providing fluid flow through a stream flow passage of the flow duct disposed along a centerline of the gas turbine engine;
using first and second rows of heat exchangers disposed along the engine centerline of the gas turbine engine and integrated in the flow duct in fluid communication with the stream flow passage of the flow duct to adjust the pressure difference across the first and second rows of heat exchangers;
adjusting airflow in the flow duct by passing air through an adjustable nozzle that is positioned within the flow duct, the adjustable nozzle having a first nozzle wall assembly and a second nozzle wall assembly that define a nozzle span; and
adjusting the airflow by adjusting the nozzle span;
wherein the first nozzle wall assembly includes a first nozzle wall and a second nozzle wall that define the nozzle span, the method further comprising:
passing the air flow from the adjustable nozzle to an adjustable diffuser that is downstream of the adjustable nozzle, the adjustable diffuser including a first diffuser wall assembly and a second diffuser wall assembly, the first diffuser wall assembly having a first diffuser wall and the second diffuser wall assembly having a second diffuser wall, wherein the first and second diffuser wall assemblies are each adjustable to adjust a diffuser span between the first diffuser wall and the second diffuser wall, such that the air passing from the nozzle span passes into the diffuser span; and scooping air in a scoop that is positioned aft of the first nozzle wall and positioned to transfer air passing through the nozzle span to a location near a start of the adjustable diffuser.

13. The method of claim 12 in which the providing fluid flow comprises providing one of bypass air flow and ram air flow.

14. The method of claim 12 in which the providing fluid comprises providing fluid through a third stream flow passage.

* * * * *